Aug. 1, 1933. V. N. HAMILTON 1,920,385
CAN PERFORATING AND CONTENTS POURING LID
Filed Oct. 25, 1930 2 Sheets-Sheet 1
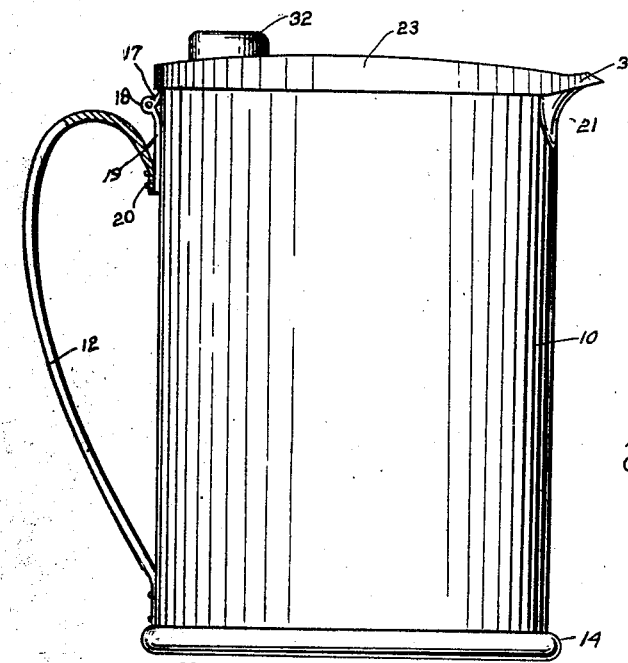
Fig. 1.
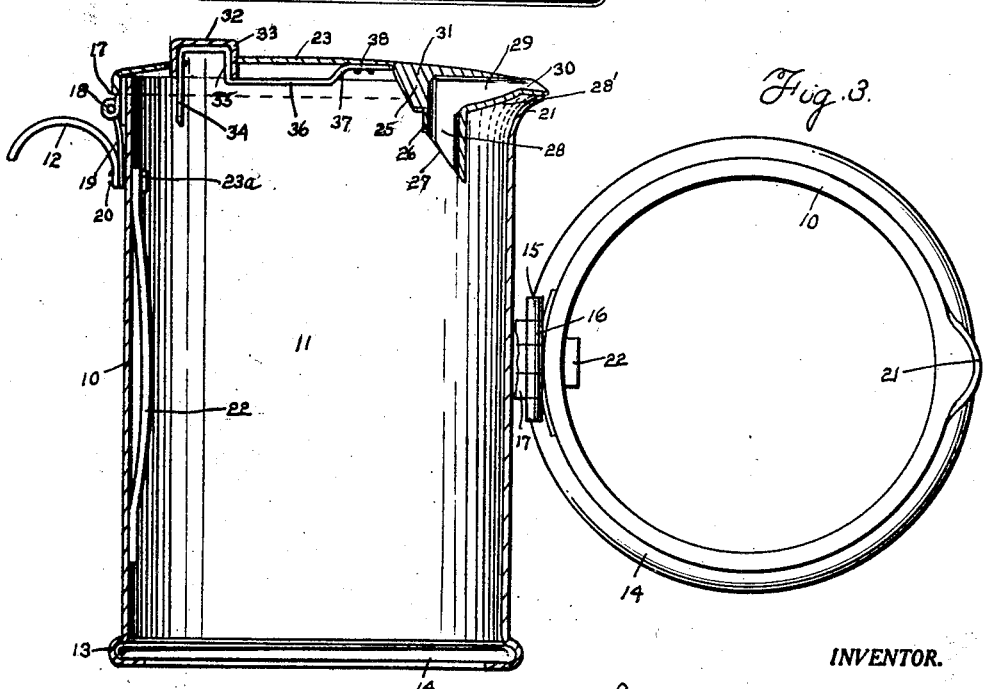
Fig. 2.
Fig. 3.
INVENTOR.
Victor N. Hamilton

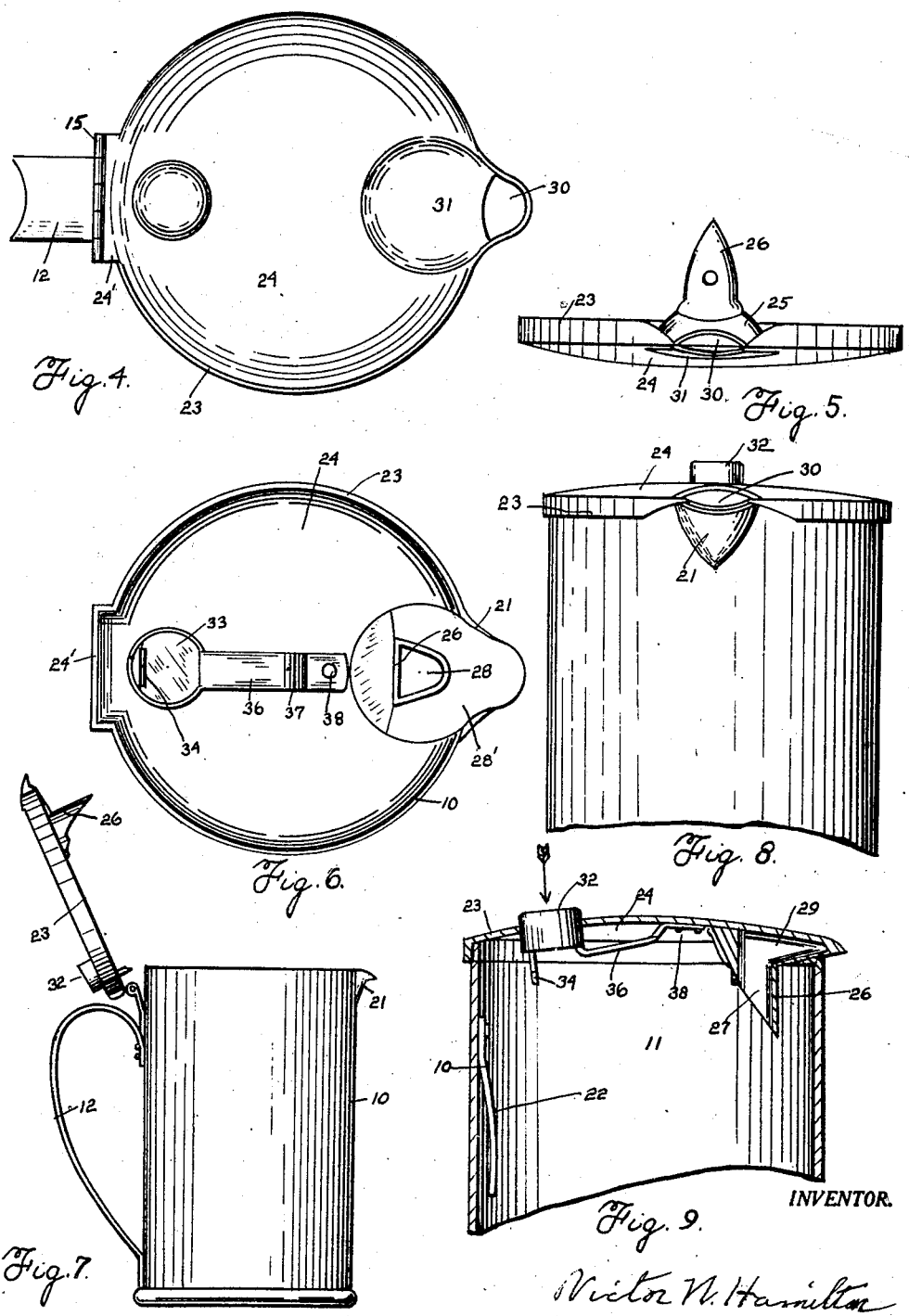

Patented Aug. 1, 1933

1,920,385

UNITED STATES PATENT OFFICE 1,920,385

CAN PERFORATING AND CONTENTS POURING LID

Victor N. Hamilton, Los Angeles, Calif., assignor to W. D. Rogers and Harry Kema, both of Los Angeles, Calif.

Application October 25, 1930. Serial No. 491,168

2 Claims. (Cl. 65—61)

This invention relates to improvements in containers holding liquids and more particularly to means for pouring out the contents thereof.

One of the objects of this invention is to provide a simple, efficient and inexpensive device of this character whereby a can of condensed milk or of syrup and the like is adapted to be perforated to provide a discharge opening and at the same time is provided with a discharge spout enabling the contents to be drained out of the can thus perforated thru the spout instead of ordinarily thru and out of the hole.

It is well known that cans of condensed milk or of syrup call for perforation at two points; at one point to provide a pouring hole and at another point to provide an air hole allowing air to escape into the can to facilitate the pouring operation.

Another object of the present invention is to provide an attachment for cans of condensed milk and the like so constructed, arranged and designed, that when pressed into contact and engagement with the top of the can a hole is instantly formed in the top of the can and means inserted into the hole by which the contents of the can can be discharged out of the can thru a spout to assure that the said contents of the can will not stream down the sides of the can in an unsanitary manner.

A further object of this invention is to provide upon a container holding a can of condensed milk, syrup or the like a lid hingedly mounted thereon and performing the three-fold service of closing the top of the container, perforating the top of the can, and providing a pouring spout for the container and can.

A still further object of this invention is to provide, in conjunction with a container in which a can is mounted a lid for closing the container, this lid being provided with a depending attachment upon its under side and front end providing a spout for the container to allow the contents of the can to be poured out thru this spout, means being carried by the attachment for perforating the top of the can to permit the contents thereof to reach the spout in a sanitary condition.

A further object of this invention is to provide a lid upon a container or in conjunction with a can of condensed milk whereby the container may be closed, and, at the same time, the top of the can can be perforated at two points.

With the above and other objects in view, my invention consists in the combination, arrangement and details of construction disclosed in the drawings and specification, and then more particularly pointed out in the appended claims.

In the drawings, wherein similar reference characters designate similar parts thruout the respective views, Figure 1 is a side elevation of my invention, Figure 2 is a vertical sectional elevation thereof, Figure 3 is a top plan view of the container with the lid shown sectionally, Figure 4 is a top plan view of my invention, Figure 5 is a side elevation of the lid in reversed position, Figure 6 is a bottom plan view of the lid, Figure 7 is a side view of the container with the lid raised, Figure 8 is a fragmental end elevation of my invention, and Figure 9 is a fragmental sectional elevation showing the push button in a depressed position.

In the drawings, which are merely illustrative of my invention the metal container 10 is of tubular formation open at its top and at its bottom, its interior being designated 11, and this container is formed with an annular bead 13 at its lower base end which is concavo-convex in cross section as at 14. The bead reinforces the container and strengthens the same, also providing therefor a rigid stand. A handle or bail 12 is secured to the rear of the container.

A lid 23 is provided of annular formation having the dome-shaped imperforate top 24, and having at its rear portion the rectangular extension 24' provided with hinge collars 15 with which register and interconnect the hinge collars 16 of a hanger 19 secured to the side of the container by fasteners 20 or the like. 17 designates an offset portion carrying the hinge collars 15 of the lid and 18 designates the pin connecting movably both sets of hinge collars of lid and hanger. The lid has a flange designed to snugly fit around the upper annular part of the container. A can of condensed milk or syrup or other similar contents is placed into the container and a leaf spring 22, secured at 23a to the inner face of the wall of the container serves to frictionally engage the can, being depressed by the can to provide interengagement between can and container.

The lid has a cylindrical cap-shaped push button 32 slidably mounted therein at the end of the lid adjacent to the hinge of the lid, and a spring arm has one end secured at 38 to the under side of the lid, has an intermediate portion 36 connected by an offset 37 to the secured end of the spring arm, this intermediate portion being spaced out of contact with the dome 24 of the lid. At the free outer end of this spring arm is an inverted U-shaped integral piece 35 fitted securely into the cap push button 32 so as to yieldingly support this push button. Depending from the spring arm U-shaped portion is an integral can top perforator or perforator arm 34 disposed coaxially of the container. When the push button is depressed this perforator will enter the top of the can and produce a hole therein for air venting purposes.

The lid is formed upon its under side and medially at its front end with a hollow outlet lip 30 producing an opening that communicates at its inner end with a spout about to be described. The container is also formed with an integral forwardly disposed lip for supporting the hollow lip of the lid. An attachment 25 is secured in depending relation upon the under side of the lid 23, and is formed with a right-angular duct consisting of the coaxial tubular perforator 26 formed with a tapering cutting edge 27, and of a horizontal channel or spout channel 29 whose bottom wall slopes upwardly from the tubular or hollow perforator. When the lid is closed the lip 30 thereof rests snugly in the lip 21 of the container 10, and then the only part that opens out of the lid is the discharge lip 30.

In operation, when the can is held frictionally against the spring 22 in container 30, the cutting edge 27 of the hollow perforator 26 rests upon the top of the can; the lid may then be pushed or pressed into the top of the can, thereby forming a hole in the can and lodging in this hole; then by imparting a sharp blow as with the palm of the hand upon the push button 32, the same is depressed, and made to perforate the can again. By tilting the container the contents of the can may now be poured out of the tubular perforator and thru the outlet 30. I do not limit myself to the exact details herein disclosed save as covered in the claims.

What I claim and intend to seek protection on is as follows:—

1. In a device as described, the combination of a tubular can having an upper front medial concavo-convex forwardly projecting lip, a lid hingedly connected upon said tubular can diametrically opposite to said lip, said lid at its forwardmost medial portion being formed with a forwardly projecting pouring lip, being U-shaped in cross-section and designed, when the lid is closed, to overlie so as to rest upon the can lip snugly, a depending tubular perforator formed upon said lid to the rear of the lip, said lid having a horizontal spout passage communicating at one end with the tubular perforator and with the lid lip at its opposite end, the under side of said passage being formed in a plane with the lid lip, the main top body of the lid terminating in back of the lid lip, whereby to open the passage at a point directly over the can lid, said tubular perforator having a lower beveled punching edge.

2. In a device as described, in combination a tubular can, a lid closing the same and hinged thereto at one end, said lid having a circular hole, a cap telescoping in said hole with its closed part disposed outermost, a spring arm having an upturned terminal secured to the underside of the lid, whereby it is spaced below the lid, the opposite end of the spaced portion of the spring arm being shaped to provide an inverted U-shaped member engaging the closed top and the side wall of the cap and having a terminal projecting below the cap at right angles to the spring arm and forming a prick punch.

VICTOR N. HAMILTON.